United States Patent Office 3,700,646
Patented Oct. 24, 1972

3,700,646
POLYFLUOROISOALKOXY-ALKYL SULFIDES
AND POLYSULFIDES
Louis G. Anello, Orchard Park, and Richard F. Sweeney,
Elma, N.Y., assignors to Allied Chemical Corporation,
New York, N.Y.
No Drawing. Continuation-in-part of application Ser. No.
119,957, Mar. 1, 1971. This application May 3, 1971,
Ser. No. 139,944
Int. Cl. C07c 149/12
U.S. Cl. 260—608          13 Claims

ABSTRACT OF THE DISCLOSURE

Novel sulfides and polysulfides of the formula

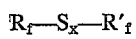

wherein $R_f$ and $R'_f$ are polyfluoroisoalkoxyalkyl radicals and $x$ is an integer 1 to 8. These novel compounds are useful as oxidation-resistant lubricants, additives to lubricants and cutting oils, and intermediates in the preparation of valuable surface active compounds.

CROSS-REFERENCES TO RELATED APPLICATION

Copending U.S. application of L. G. Anello and R. F. Sweeney Ser. No. 119,957, entitled "Polyfluoroisoalkoxyalkyl Sulfonic Acids and Derivatives Thereof" filed Mar. 1, 1971 of which the present application is a continuation-in-part.

Copending U.S. application of L. G. Anello, R. F. Sweeney and M. H. Litt Ser. No. 818,832 filed Apr. 23, 1969, entitled "Polyfluoroisoalkoxyalkyl Halides" now abandoned.

BACKGROUND OF THE INVENTION

This invention relates to novel fluorinated aliphatic mono-sulfides and polysulfides characterized by terminal fluorinated perhaloisoalkoxy substituents, that is the novel compounds of the invention contain two terminal polyfluorinated branched chain- or cyclic-perhaloisoalkoxy groups of which is lined through an ether oxygen to a perfluoromethylene substituent. The present novel mono- and polysulfides are useful as lubricants, and as additives to lubricants and cutting oils. Polysulfides of the invention are also useful as intermediates in the preparation of polyfluoroisoalkoxyalkyl sulfonyl halides and sulfonic acids containing the corresponding polyfluoroisoalkoxyalkyl substituents. These sulfonyl halides and sulfonic acids are valuable chemical intermediates and surface active agents, respectively, as is disclosed in our aforementioned copending U.S. application Ser. No. 119,957, entitled "Polyfluoroisoalkoxyalkyl Sulfonic Acids and Derivatives Thereof" filed Mar. 1, 1971 of which the present application is a continuation-in-part. Certain perfluoroisoalkoxyalkyl polysulfides of the invention and their use as intermediates in the preparation of the corresponding perfluoroalkoxyalkyl sulfonyl halides and sulfonic acids are disclosed in the aforementioned parent application.

An object of the present invention is the provision of novel polyfluoroisoalkoxyalkyl sulfides.

Another object of the invention is the provision of novel polyfluoroisoalkoxyalkyl polysulfides.

These and additional objects and advantages of the invention will be apparent from the following description of our invention.

SUMMARY OF THE INVENTION

The above objects are attained according to the invention in novel fluorocarbon compounds represented by the general formula

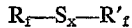          (I)

wherein $R_f$ and $R'_f$ independently at each occurrence are radicals of the formula

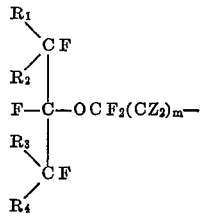

wherein
(i) $R_1$, $R_2$, $R_3$ and $R_4$ are independently at each occurence fluorine, chlorine or perhaloalkyl having from 1 to 9 carbon atoms or $R_1$ and $R_3$ when taken together, are perhaloalkylene groups forming a homocyclic aliphatic structure of from 4 to 6 carbon atoms which halo substituents thereof are fluorine or chlorine with the proviso that no more than three of the $R_1$–$R_4$ groups are perhaloalkyl groups,
(ii) Z, which may be the same or different in different $CZ_2$ groups is hydrogen or fluorine,
(iii) $m$ is 0 or an integer 1 to 39, and $x$ is an integer 1 to 8.

The criticality in the molecule of the novel compounds of the invention is the presence of the central sulfide or polysulfide substituent, —$S_x$—, and in the structure of the fluoroisoalkoxyperfluoroalkylene portion of the molecule, that is of

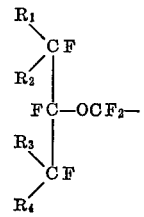

The latter structure is critically characterized by the presence of an ether oxygen atom simultaneously linked to (a) a carbon atom linked to a fluorine atom as well as to two fluorinated perhaloalkyl groups and (b) a perfluoromethylene group. The aforementioned fluorinated perhaloalkyl groups are characterized by the presence of at least one fluorine substituent on each carbon adjacent to the carbon linked to the ether oxygen atom. The fluorinated perhaloalkyl groups when taken together form a homocyclic aliphatic structure.

DETAILED DESCRIPTION OF THE INVENTION AND PREFERRED EMBODIMENTS THEREOF

The novel compounds of the invention can be prepared by reaction of an inorganic sulfur-containing reagent and fluorinated isoalkoxyalkyl primary iodides having the Formula II.

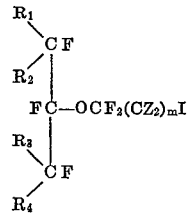          (II)

wherein $R_1$, $R_2$, $R_3$ and $R_4$, Z and $m$ have the same meanings given above.

Iodide starting materials delineated by (II) are fluoroperhaloisoalkoxyperfluoromethyl iodides (II, $m$=0) fluoroperhaloisoalkoxy tetra- or difluoroethyl iodides (II, $m$=1, Z=fluorine and II, $m$=1, Z=hydrogen respectively) hereinafter referred to as telogen iodides and their condensation, that is telomerization, products with a telomerizable olefin selected from ethylene, tetrafluoroethylene and vinylidene fluorine which condensates are hereinafter referred to as telomer iodides.

Telogen iodides of Formula II wherein $m$ is 1 and X is fluorine are disclosed by Litt et al., U.S. Pat. 3,453,333 issued July 1, 1969 and by Evans et al., U.S. Pat. 3,470,256 issued Sept. 30, 1969.

Telogen iodides of Formula II wherein $m$ is 0 are prepared from the foregoing telogen iodides (II) wherein $m$ is 1 and Z is fluorine by liquid phase reaction with sulfur trioxide at 50–175° C. to replace the iodide substituent with the radical —COF, hydrolysis of the resultant acyl fluoride to the corresponding carboxylic acid, neutralization of the resultant carboxylic acid with alkali-free silver oxide and finally iodination of the resultant silver carboxylate to form, via concurrent decarboxylation, the desired telogen iodide (II) wherein $m$ is 0. The foregoing conversion of telogen iodides of Formula II wherein $m$ is 1 and Z is fluorine to the corresponding telogen iodide of Formula II wherein $m$ is 0 is more particularly described in the copending application of Anello et al., U.S. patent application Ser. No. 818,832 filed Apr. 23, 1969 entitled "Polyfluoroisoalkoxyalkyl Halides" now abandoned, the pertinent subject matter of which is incorporated herein by reference.

Telogen iodides represented by Formula II wherein $m=1$ and Z=hydrogen can be readily prepared from the aforementioned telogen iodide of Formula II wherein $m=1$ and Z=fluorine by the above described conversion of the terminal —CF$_2$I group to the acyl fluoride group, —COF, esterification of the terminal —COF group with a lower aliphatic alcohol to form a terminal alkyl carboxylate group, reduction of the latter ester group to —CH$_2$OH with lithium aluminum hydride, esterification of the latter terminal primary alcohol group by reaction with p-toluene sulfonyl chloride, and conversion of the resultant p-toluenesulfonate ester group by reaction with alcoholic potassium iodide to the terminal —CH$_2$I group thereby obtaining the iodide represented by Formula II $m=1$, Z=hydrogen. The aforementioned conversion of the terminal acyl fluoride group to the corresponding —CH$_2$OH group is more particularly described in Canadian Pat. 852,256 of L. G. Anello et al. issued Sept. 22, 1970. The foregoing procedure for converting the terminal primary alcohol group to the terminal —CH$_2$I group is conventional in the art being disclosed in Method 208, Lovelace et al. "Aliphatic Fluorine Compounds" Rheinhold Publishing Corp., 1958, p. 42.

The aforementioned telomerization of the foregoing telogen iodides with ethylene, tetrafluoroethylene or vinylidene fluoride, which may be effected stepwise employing different telomerizable olefins in the various steps, is carried out in accordance with the procedure of Anello et al., U.S. Pat. 3,514,487 issued May 26, 1970. As is disclosed in the aforementioned telogen iodides with vinylidene fluoride provide two telomer products, namely a principal telomer product wherein the alkyl residue of the telogen iodide is attached to the methylene group in the telomer and the iodide residue of the telogen is attached to the difluoromethylene group in the telomer product and a minor product wherein the alkyl residue of the telogen is attached to the difluoromethylene group in the telomer and the iodide residue to the methylene group in the telomer product, which products are readily separated by conventional techniques.

The novel compounds of the invention can be prepared, conveniently, by heating polyfluoroisoalkoxyalkyl iodides of Formula II with an inorganic sulfur-containing reagent such as elemental sulfur, an alkali metal sulfide such as Na$_2$S, an alkali metal polysulfide such as Na$_2$S$_x$ wherein $x$ has the aforementioned meaning, a mixture of an alkali metal sulfide and elemental sulfur or an alkali metal thiosulfate, such as Na$_2$S$_2$O$_3$, according to techniques conventional in the art of converting prior art alkyl primary halides to the corresponding sulfides and polysulfides.

By reaction of a single polyfluoroisoalkoxyalkyl iodide of Formula II and an inorganic sulfur-containing reagent of the aforementioned type, symmetrically substituted sulfides and polysulfides of the invention are obtained, that is, sulfides and polysulfides corresponding to the Formula I wherein $R_f$, $R'_f$ and $x$ have the aforementioned meanings and $R_f=R'_f$.

By reaction of a mixture of different polyfluoroisoalkoxyalkyl iodides of Formula II, for example an equimolar mixture of two different iodides of Formula II, with an inorganic sulfur containing reagent unsymmetrically substituted sulfides and polysulfides of the invention are obtained which correspond to the Formula I wherein $R_f$, $R'_f$ and $x$ have the aforementioned meanings, and $R_f$ and $R'_f$ are different polyfluoroisoalkoxy radicals.

In general the choice of a particular inorganic sulfur containing reagent for the aforementioned preparatory reaction determines whether the product corresponding to Formula I above is a sulfide, a polysulfide, or a mixture of mono- and polysulfides. Thus, use of alkali metal sulfide as the inorganic sulfur-containing reagent provides a polyfluoroisoalkoxyalkyl mono-sulfide, that is a product corresponding to Formula I above wherein $x$ is 1. Use of an alkali metal polysulfide or an alkali metal thiosulfate, on the other hand, provides as product a polyfluoroisoalkoxyalkyl polysulfide, that is a product corresponding to Formula I above wherein $x$ is 2 to 8. Use of elemental sulfur, or a mixture of elemental sulfur and an alkali metal sulfide provides a product mixture containing polyfluoroisoalkoxyalkyl mono- and polysulfides. The mono-sulfide and the individual polysulfides in the latter product mixture can be readily separated by known techniques for example by zone melting techniques, by vapor phase chromatography, or advantageously, by fractional distillation as is illustrated in Example 1 below.

The amount of inorganic sulfur-containing reagent and polyfluorinated iodide charged in the aforementioned preparatory reaction in general corresponds to at least about 0.5 molar proportion per molar proportion of the polyfluorinated iodide. Advantageously, the inorganic sulfur-containing reagent is charged in a stoichiometric excess corresponding to about 1.0–5.0 especially about 1.0 to 3.0 molar proportions per molar proportion of the polyfluorisoalkoxyalkyl iodide. Use of an amount of inorganic sulfur-containing reagent corresponding to about 20.0 molar proportions or more per molar proportion of the polyfluorinated iodide reactant, while effective, provides no additional advantage.

The aforementioned preparatory reactions can be carried out in absence or advantageously in the presence of an inert solvent, for example, a polar organic solvent. Polar organic reaction solvents useful in preparing the compounds of the invention include lower aliphatic alcohols, that is alkyl mono- and poly-hydric alcohols of 1 to 6 carbon atoms such as methanol, ethanol, propanol, isopropanol and diethylene glycol, N,N-lower alkyl-lower alkanamides such as dimethyl formamide and bis-lower alkyl sulfoxides such as dimethyl sulfoxide which is the preferred solvent employed when the inorganic sulfur-containing reagent used contains alkali metal sulfide. The solvent is generally charged in an amount sufficient to dissolve the inorganic sulfur-containing reagent and the polyfluoroisoalkoxyalkyl iodide. If desired, the aqueous organic polar solvent can contain up to about 60 volume percent water.

In the presence of a reaction solvent the aforementioned preparatory reaction is carried out by heating the inorganic sulfur-containing reagent and the polyfluorinated iodide at a temperature in the range of about 65° to 200° C. or higher preferably at about 80°–110° C. In carrying out the preparatory reaction in absence of a reaction solvent, a higher reaction temperature such as a temperature in the range of about 150°–450° C. or higher especially about 400°–450° C. is generally required. Time of reaction is not critical and can range from about 30 minutes to 36 hours or longer. Generally the reaction is complete in about 2 to 24 hours.

The aforementioned preparatory reaction can be carried out at atmospheric pressure, or if desired at a superatmospheric pressure, for example at the autogenous pressure developed by the reaction mass on being heated to the reaction temperature in a sealed tube or autoclave.

The foregoing preparatory reaction techniques are more particularly described in Kirk-Othmer, "Encyclopedia of Chemical Technology," Interscience Publishing Co., first edition, 1954, volume 13, pages 295–307, Houben-Weyl, "Methoden der Organischen Chemie," G. Thieme Verlag, Stuttgart, fourth edition, 1955, volume IX, pages 65–66, 89, 91–92, 97–102, R. N. Haszeldine and J. M. Kidd, J. Chem. Soc. 3871 (1955) and A. M. Lovelace et al., "Aliphatic Fluorine Compounds," Rheinhold Publishing Corporation, 1958, pages 332–333 the preparatory technology of these references being incorporated herein by reference.

Symmetrically substituted compounds of the invention, that is, compounds of Formula I wherein $R_f = R'_f$ are contemplated as a preferred class of compounds of the invention.

In preferred compounds of the invention $R_1$, $R_2$, $R_3$ and $R_4$ are fluorine. Preferably, also, the invention is directed to monosulfides, disulfides and trisulfides, that is compounds corresponding to Formula I wherein $x$ is 1 to 3, since in the foregoing preparatory procedures wherein both mono-, and poly-sulfide products are concurrently formed, the mono-, di- and trisulfides generally predominate in the product mixture over the higher polysulfide products.

Perfluoroisoalkoxyalkyl sulfides and polysulfides of the invention which are represented by Formula I wherein $R_1$, $R_2$, $R_3$ and $R_4$ are fluorine or perfluoroalkyl and $x$ is fluorine constitutes an especially preferred group of compounds according to the invention.

An additionally especially preferred class of compounds of the invention are represented by Formula III below $$[(CF_3)_2CFO(CF_2)_r(CH_2)_p-]_2S_x \qquad (III)$$

wherein $r$ and $p$ are each integers 1 to 20 and $x$ is an integer 1 to 3.

The novel polyfluoro-ether group-substituted aliphatic mono-sulfides and polysulfides of the invention are oily or greasy materials characterized by excellent lubricating properties. These novel fluorinated organic sulfur compounds are particularly useful as lubricants or as additives to lubricants, particularly high pressure lubricants such as are employed for example in hypoid gears. The present novel sulfides and polysulfides are unusually stable to oxidation, which renders them particularly suitable in lubricating applications which require a lubricant or lubricant additive resistant to oxidation. The present novel compounds are also useful as additives to cutting oils.

The polyfluoroisoalkoxyalkyl polysulfides of the invention are also useful intermediates in the preparation of the corresponding polyfluoroisoalkoxyalkyl sulfonyl halides and sulfonic acids which are valuable chemical intermediates and surface agents, respectively. The conversion of the present novel polysulfides to the latter compounds involves conversion of the polysulfides to the corresponding polyfluoroisoalkoxyalkyl sulfenyl chloride by reaction of the polysulfide with molecular chlorine under ultra-violet radiation and substantially anhydrous conditions at ambient temperature for about 10–15 days followed by conventional distillation of the reaction mass to recover the desired sulfenyl chloride in accord with the conventional synthetic technique of R. N. Haszeldine and J. M. Kidd, J. Chem. Soc. 3210 (1953). Alternatively the reaction of the polysulfides and chlorine is carried out in absence of ultraviolet radiation by heating the reactants at about 20–250° C., advantageously at about 50–150° C. for about 10 minutes to 36 hours. In the foregoing conversions of the present polysulfides to the corresponding polyfluoroisoalkoxyalkyl sulfenyl chlorides, the chlorine reactant should be charged in an amount ranging from about 1.0 to about 10.0 molar proportions of chlorine per mol of the polysulfide. The reaction pressure, however, is not critical and can range from about atmospheric pressure to superatmospheric pressures of about 10,000 p.s.i.g. or higher.

The resultant polyfluoroisoalkoxyalkyl sulfenyl chloride which is obtained as product in the above described reaction is converted to the corresponding desired sulfonyl chloride by oxidizing the sulfenyl chloride with a stoichiometric excess of molecular chlorine in water at ambient temperature in accordance with the conventional synthetic technique of R. N. Haszeldine and J. M. Kidd, J. Chem. Soc. 2901 (1955). Conventional hydrolysis of the resultant sulfonyl chloride provides the corresponding polyfluoroisoalkoxyalkyl sulfonic acid. The foregoing conversion of polysulfides of the invention to the corresponding sulfonyl halides and sulfonic acids and the use of the latter compounds as surface active agents is more particularly described in Examples 3 and 42 below as well as in the aforementioned copending U.S. application of which the present application is a continuation-in-part.

The present novel polysulfides are also useful as intermediates in the production of corresponding polyfluoroisoalkoxyalkyl mercaptans. The latter compounds can be prepared by reaction of the present novel polysulfides with hydrogenation agents according to procedures known in the art. For example zinc dust and aqueous hydrochloric acid may be charged as hydrogenating agent, the hydrogenation of the polysulfide being carried out at the refluxing temperature of the aqueous acidic mass. The polyfluoroisoalkoxyalkyl mercaptans thus obtained are, in the form of their metal hydrogenation products are, in the form of their metal salts, for example their alkali metal salts, valuable surface active agents.

In the following examples which serve to illustrate our invention percentages and proportions unless otherwise noted are by weight and temperatures are in degrees centigrade.

EXAMPLE 1

A 500 ml. 3-neck flask equipped with stirrer, reflux condenser, thermometer and addition funnel is charged with 120 ml. of dimethyl sulfoxide, 45 ml. of water, 130 g. (0.54 mole) of $Na_2S \cdot 9H_2O$ and 18 g. (0.56 gram atom) of sulfur. The mixture is heated at 80° C. until solution is complete (that is, for about 1 hour) and then 237 g. (0.54 mole) of $(CF_3)_2CFOCF_2CF_2CH_2CH_2I$ is slowly added. After heating at reflux for about 16 hours, the reaction mixture is water-washed to remove solvent, sulfide salts and by-product sodium iodide. The resultant washed water-insoluble oil is dried and distilled under diminished pressure to give 18 g. (0.041 mole) of starting material iodide, B.P. 54–61°/10 mm., 51 g. (0.075 mole) of $[(CF_3)_2CFOCF_2CF_2CH_2CH_2]_2S$, B.P. 110–112°/10 mm.

*Analysis.*—Calculated for $C_{14}F_{22}H_8O_2S$ (percent): C, 24.73; F, 64.78; H, 1.18; S, 4.72. Found (percent): C, 24.59; F, 63.92; H, 1.14; S, 5.54, 67 g. (0.094 mole) of $[(CF_3)'CFOCF_2CF_2CH_2CH_2]_2S_2$, B.P. 122–127°/10 mm.

*Analysis.*—Calculated for $C_{14}F_{22}H_8O_2S_2$ (percent): C, 23,66; F, 61.69; H, 1.12; S, 9.01. Found (percent): C, 22.92; F, 60.05; H, 1.13; S, 10.01 and 23 g. (0.031 mole) of $[(CF_3)_2CFOCF_2CF_2CH_2CH_2]_2S_3$, B.P. 140–140°/10 mm.

*Analysis.*—Calculated for $C_{14}F_{22}H_8O_2S_3$ (percent): C, 22.64; F, 59.03; H, 1.08; S, 12.93. Found (percent): C, 22.53; F, 58.03; H, 1.14; S, 13.52. The foregoing sulfide and polysulfide products are oily materials which are useful for lubricating the bearings of a laboratory stirring apparatus.

EXAMPLE 2

To a 300 ml. stainless steel autoclave are charged 100 g. (0.24 mole) of $(CF_3)_2CFOCF_2CF_2I$ and 32 g. (1.0 gram atom) of sulfur. The autoclave is evacuated, sealed and heated with agitation at about 450° for 12 hours under autogenous superatmospheric pressure. The autoclave is then allowed to cool to ambient temperature and the liquid contents are discharged and filtered to remove unreacted sulfur and recover as filtrate a crude disulfide of the formula $$(CF_3)_2CFO(CF_2)_2S\text{—}S\text{—}(CF_2)_2OCF(CF_3)_2$$

which contains minor amounts of the corresponding monosulfide of the formula $$(CF_3)_2CFO(CF_2)_2\text{—}S\text{—}(CF_2)_2OCF(CF_3)_2$$

as well as minor amounts of corresponding higher polysulfides such as the corresponding trisulfide, of the formula $$(CF_3)_2CFO(CF_2)_2\text{—}S\text{—}S\text{—}S\text{—}(CF_2)_2OCF(CF_3)_2$$

The reaction product is an oil material having excellent lubricating properties similar to those of the products of Example 1.

The following Example 3 illustrates the conversion of the present novel polysulfides, to the corresponding valuable sulfonyl halides and sulfonic acids.

EXAMPLE 3

About 20 g. (0.030 mole) of the polyfluoroisoalkoxyalkly polysulfide of Example 2 and 10 g. (0.28 mole) of dry chlorine gas are charged to a 100 ml. Pyrex Carius tube. The tube is evacuated, sealed and exposed to ultraviolet radiation at room temperature for about 12 days. The tube is opened and the contents are distilled to recover as distillate the sulfenyl chloride of the formula $$(CF_3)_2CFO(CF_2)_2SCl$$

About 15 g. (0.041 mole) of $(CF_3)_2CFO(CF_2)SCl$ prepared as described above, 5 g. (0.14 mole) of chlorine, and 5 g. (0.28 mole) of water are vigorously agitated in a 100 ml. Pyrex tube at ambient temperature for about 10 days to give gaseous hydrogen chloride and a substantially quantitative yield of the sulfonyl chloride having the formula $$(CF_3)_2CFO(CF_2)_2SO_2Cl$$

About 20 g. (0.05 mole) of $(CF_3)_2CFO(CF_2)_2CO_2Cl$, prepared as described above and 20 ml. of water are charged to a 100 ml. three necked flask and agitated at about 75° for about 12 hours. The resultant aqueous reaction mass contains the corresponding polyfluoroisoalkoxyalkyl sulfonic acid of the formula $$(CF_3)_2CFO(CF_2)_2SO_2OH$$

The following Examples 4–37 illustrate additional symmetrically substituted sulfide and polysulfide compounds of the invention which are prepared from the corresponding polyfluoroisoalkoxyalkyl iodides in accordance with the synthetic techniques of Examples 1 and 2.

EXAMPLE 4

$[(CF_3)_2CFOCF_2CH_2]_2S$

EXAMPLE 5

$[(CF_3)_2CFO(CF_2)_5(CH_2CF_2)_4(CH_2)_2]_2S_2$

EXAMPLE 6

$[(CF_3)_2CFOCF_2]_2S_3$

EXAMPLE 7

$[(CF_3)_2CFOCF_2CH_2CF_2]_2S$

EXAMPLE 8

$[(CF_3)_2CFO(CF_2)_5]_2S$

EXAMPLE 9

$[(CF_3)_2CFO(CF_2)_3]_2S_5$

EXAMPLE 10

$[(CF_3)_2CFO(CF_2)_{20}CH_2]_2S$

EXAMPLE 11

$[(CF_3)_2CFO(CF_2)_{40}]_2S_7$

EXAMPLE 12

$[(CF_3)_2CFOCF_2(CH_2CF_2)_5CH_2]_2S_8$

EXAMPLE 13

$[(CF_3)_2CFO(CF_2)_3CH_2]_2S_3$

EXAMPLE 14

$[(C_2F_5)_2CFOCF_2(CF_2CH_2)_4CF_2]_2S_4$

EXAMPLE 15

$[(CF_2Cl)_2CFO(CF_2)_2(CH_2)_4(CF_2)_7]_2S_2$

EXAMPLE 16

$[(CF_3)_2CFOCF_2]_2S_8$

EXAMPLE 17

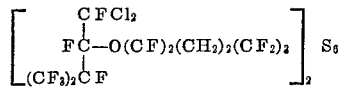

EXAMPLE 18

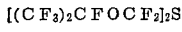

EXAMPLE 19

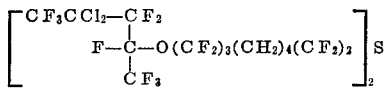

EXAMPLE 20

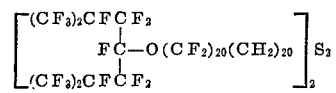

EXAMPLE 21

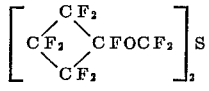

EXAMPLE 22

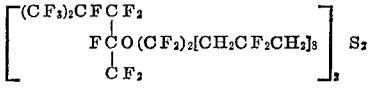

EXAMPLE 23

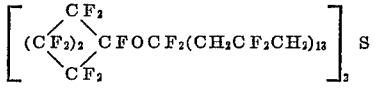

EXAMPLE 24

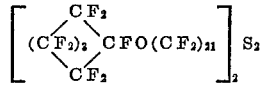

EXAMPLE 25

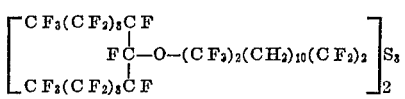

EXAMPLE 26

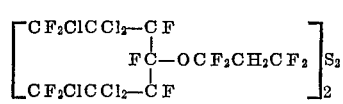

EXAMPLE 27

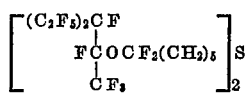

EXAMPLE 28

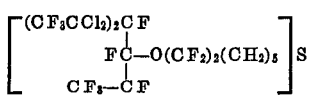

EXAMPLE 29

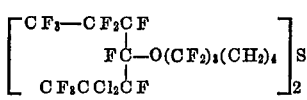

EXAMPLE 30

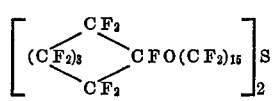

EXAMPLE 31

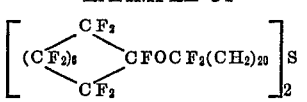

EXAMPLE 32

$[(CF_3)_2CFO(CF_2)_4(CH_2)_2]_2S$

EXAMPLE 33

$[(CF_3)_2CFO(CF_2)_4(CH_2)_2]_2S_2$

EXAMPLE 34

$[(CF_3)_2CFO(CF_2)_4(CH_2)_2]_2S_3$

EXAMPLE 35

$[(CF_3)_2CFO(CF_2)_6(CH_2)_2]_2S$

EXAMPLE 36

$[(CF_3)_2CFO(CF_2)_6(CH_2)_2]_2S_2$

EXAMPLE 37

$[(CF_3)_2CFO(CF_2)_6(CH_2)_2]_2S_3$

The following Examples 38–41 illustrate unsymmetrically-substituted sulfides and polysulfides of the invention corresponding to Formula I above wherein $R_f$, $R'_f$ and $x$ have the aforementioned meanings. The novel compounds of these examples are prepared by reaction of a mixture of about equimolar proportions of two dissimilar polyfluoroisoalkoxyalkyl iodides, $R_fI$ and $R'_fI$, according to the synthetic techniques of Example 1 and Example 2.

EXAMPLE 38

The procedure of Example 1 is repeated substantially as described in reacting a mixture containing about equimolar proportions of $(CF_3)_2CFO(CF_2)_2(CH_2)_2I$ and $(CF_3)_2CFO(CF_2)_4(CH_2)_2I$ with $Na_2S \cdot 9H_2O$ and sulfur to obtain as unsymmetrically substituted products the following novel compounds $(CF_3)_2CFO(CF_2)_2(CH_2)_2-S-$
$\quad\quad\quad\quad\quad\quad\quad (CH_2)_2(CF_2)_4OCF(CF_3)_2$
$(CF_3)_2CFO(CF_2)_2(CH_2)_2-S_2-$
$\quad\quad\quad\quad\quad\quad\quad (CH_2)_2(CF_2)_4OCF(CF_3)_2$
$(CF_3)_2CFO(CF_2)_2(CH_2)_2-S_3-$
$\quad\quad\quad\quad\quad\quad\quad (CH_2)_2(CF_2)_4OCF(CF_3)_2$

EXAMPLE 39

The procedure of Example 1 is repeated, substantially as described in reacting a mixture containing about equimolar proportions of $(CF_3)_2CFO(CF_2)_2(CH_2)_2I$ and $(CF_3)_2CFO(CF_2)_6(CH_2)_2I$ with $Na_2S \cdot 9H_2O$ and sulfur to obtain as unsymmetrically substituted products the following novel compounds $(CF_3)_2CFO(CF_2)_2(CH_2)_2-S-$
$\quad\quad\quad\quad\quad\quad\quad (CH_2)_2(CF_2)_6OCF(CF_3)_2$
$(CF_3)_2CFO(CF_2)_2(CH_2)_2-S_2-$
$\quad\quad\quad\quad\quad\quad\quad (CH_2)_2(CF_2)_6OCF(CF_3)_2$
$(CF_3)_2CFO(CF_2)_2(CH_2)_2-S_3-$
$\quad\quad\quad\quad\quad\quad\quad (CH_2)_2(CF_2)_6OCF(CF_3)_2$

EXAMPLE 40

The procedure of Example 1 is repeated, substantially as described in reacting a mixture containing about an equimolar proportion of $(CF_3)_2CFO(CF_2)_4(CH_2)_2I$ and $(CF_3)_2CFO(CF_2)_6(CH_2)_2I$ with $Na_2S \cdot 9H_2O$ and sulfur to obtain as unsymmetrically-substituted products the following novel compounds $(CF_3)_2CFO(CF_2)_4(CH_2)_2-S-$
$\quad\quad\quad\quad\quad\quad\quad (CH_2)_2(CF_2)_6OCF(CF_3)_2$
$(CF_3)_2CFO(CF_2)_4(CH_2)_2-S_2-$
$\quad\quad\quad\quad\quad\quad\quad (CH_2)_2(CF_2)_6OCF(CF_3)_2$
$(CF_3)_2CFO(CF_2)_4(CH_2)_2-S_3-$
$\quad\quad\quad\quad\quad\quad\quad (CH_2)_2(CF_2)_6OCF(CF_3)_2$

EXAMPLE 41

The procedure of Example 2 is repeated, substantially as described in reacting a mixture containing about equimolar proportions of $(CF_3)_2CFO(CF_2)_2I$ and $(CF_3)_2CFO(CF_2)_4I$ with elemental sulfur. There is recovered as unsymmetrically-substituted product a crude disulfide of the formula $(CF_3)_2CFO(CF_2)_2-S_x-(CF_2)_4OCF(CF_3)$ which contains minor amounts of the corresponding monosulfide of the formula $(CF_3)_2CFO(CF_2)_2-S-(CF_2)_4OCF(CF_3)_2$ and higher polysulfides such as the pentasulfide of the formula $(CF_3)_2CFO(CF_2)_2-S_5-(CF_2)_4OCF(CF_3)_2$ The unsymmetrically-substituted polysulfide products of this example as well as those of Examples 38–40 provide on treatment in accordance with the procedure of Example 3 a mixture of two polyfluoroisoalkoxyalkyl sulfonic acids the polyfluoroisoalkoxyalkyl groups of which correspond to the polyfluoroisoalkoxyalkyl residues in the polysulfide starting material.

The following Example 42 illustrates the utility of the present novel polysulfides as precursors for valuable organic surface-active agents.

EXAMPLE 42

The disulfide products of Example 1, Example 33, and Example 36 are each treated in substantial accord with the procedure of Example 3 to convert them to the corresponding aqueous polyfluoroisoalkoxyalkyl sulfonic acids. Aliquots of each aqueous acid are diluted with water to prepare 0.01, 0.1 and 0.5% solutions of each acid. The surface tension of each of the latter aqueous acid solutions is then determined at room temperature, that is at about 25°, on a wetting balance in substantial accord with the method of J. Guastalla, J. Colloid Sci., 11, 623 (1956). The measured surface tensions are compared with the surface tension of water at room temperature in the table below:

TABLE

| Compound | Concentration of aqueous solution, percent | Surface tensions (dynes/ cm. in distilled water at 25° C.) |
|---|---|---|
| Distilled water | | 72.1 |
| $(CF_3)_2CFO(CF_2)_2(CH_2)_2SO_2OH$ | 0.01 | 55.5 |
| | 0.1 | 29.4 |
| | 0.5 | 19.3 |
| $(CF_3)_2CFO(CF_2)_4(CH_2)_2SO_2OH$ | 0.01 | 37.5 |
| | 0.1 | 16.4 |
| | 0.5 | 16.8 |
| $(CF_3)_2CFO(CF_2)_6(CH_2)_2SO_2OH$ | 0.01 | 27.9 |
| | 0.1 | 17.1 |
| | 0.5 | 1.3 |

The unusually low surface tensions of the aqueous sulfonic acids compared to that of water demonstrates that the present polysulfide compounds are precursors of highly effective surface active agents.

We claim:

1. Novel compounds of the formula $$R_f\text{—}S_x\text{—}R'_f$$

wherein $R_f$ and $R'_f$ independently at each occurrence are radicals of the formula

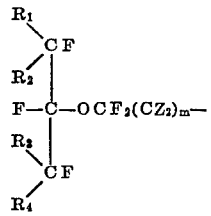

wherein
(i) $R_1$, $R_2$, $R_3$ and $R_4$ are independently at each occurrence are fluorine, chlorine or perhaloalkyl having from 1 to 9 carbon atoms or $R_1$ and $R_3$ when taken together are perhaloalkylene groups forming a homocyclic aliphatic structure of from 4 to 6 carbon atoms which halo substituents thereof are fluorine or chlorine with the proviso that no more than three of the $R_1$–$R_4$ groups are prehaloalkyl groups,
(ii) Z, which may be the same or different in different $CZ_2$ groups, is hydrogen or fluorine,
(iii) $m$ is 0 or an integer 1 to 39, and $x$ is an integer 1 to 8.

2. Compounds as claimed in claim 1 wherein $R_f=R'_f$.

3. Compounds as claimed in claim 2 wherein $R_1$, $R_2$, $R_3$ and $R_4$ are fluorine or perfluoroalkyl and X is fluorine.

4. Compounds as claimed in claim 3 wherein $x$ is an integer 1 to 3.

5. A compound as claimed in claim 4 having the formula $$(CF_3)_2CFO(CF_2)_2\text{—}S\text{—}(CF_2)_2OCF(CF_3)_2$$

6. A compound as claimed in claim 4 having the formula $$(CF_3)_2CFO(CF_2)_2\text{—}S_2\text{—}(CF_2)_2OCF(CF_3)_2$$

7. A compound as claimed in claim 4 having the formula $$(CF_3)_2CFO(CF_2)_2\text{—}S_3\text{—}(CF_2)_2OCF(CF_3)_2$$

8. Compounds as claimed in claim 2 wherein $R_1$, $R_2$, $R_3$ and $R_4$ are fluorine.

9. Compounds as claimed in claim 2 wherein $x$ is an integer 1 to 3.

10. Compounds as claimed in claim 2 having the formula $$[(CF_3)_2CFO(CF_2)_r(CH_2)_p\text{—}]_2S_x$$

wherein $r$ and $p$ are each integers 1 to 20 and $x$ is an integer 1 to 3.

11. A compound as claimed in claim 10 having the formula $$[(CF_3)_2CFOCF_2CF_2CH_2CH_2]_2S$$

12. A compound as claimed in claim 10 having the formula $$[(CF_3)_2CFOCF_2CF_2CH_2CH_2]_2S_2$$

13. A compound as claimed in claim 10 having the formula $$[(CF_3)_2CFOCF_2CF_2CH_2CH_2]_2S_3$$

References Cited
UNITED STATES PATENTS

| 3,062,894 | 4/1962 | Harris | 260—609 R |
| 3,553,168 | 6/1971 | Smith | 260—609 R |

LEWIS GOTTS, Primary Examiner

D. R. PHILLIPS, Assistant Examiner

U.S. Cl. X.R.

252—353; 260—503, 543 R, 543 H, 609 R, 609 D